United States Patent
Tachibana

(10) Patent No.: US 8,962,732 B2
(45) Date of Patent: Feb. 24, 2015

(54) ANTI-FROST COATING

(75) Inventor: Tetsuya Tachibana, Tokyo (JP)

(73) Assignee: Nihon Tokushu Toryo Co., Ltd., Kita-ku, Tokyo (JP)

( * ) Notice: Subject to any disclaimer, the term of this patent is extended or adjusted under 35 U.S.C. 154(b) by 0 days.

(21) Appl. No.: 14/238,776

(22) PCT Filed: Mar. 22, 2012

(86) PCT No.: PCT/JP2012/057356
§ 371 (c)(1), (2), (4) Date: Feb. 13, 2014

(87) PCT Pub. No.: WO2013/140576
PCT Pub. Date: Sep. 26, 2013

(65) Prior Publication Data
US 2014/0200301 A1 Jul. 17, 2014

(51) Int. Cl.
*C08K 3/18* (2006.01)
*C09D 5/32* (2006.01)
*C09D 7/12* (2006.01)

(52) U.S. Cl.
CPC ............... *C09D 5/32* (2013.01); *C09D 7/1216* (2013.01)
USPC ...................................................... 524/430

(58) Field of Classification Search
USPC ........................................................ 524/430
See application file for complete search history.

(56) References Cited

U.S. PATENT DOCUMENTS

| | | | |
|---|---|---|---|
| 7,439,279 | B2 | 10/2008 | Kondo et al. |
| 2005/0288385 | A1* | 12/2005 | Kondo et al. .................. 522/83 |
| 2008/0220264 | A1 | 9/2008 | Iyer et al. |
| 2009/0012220 | A1 | 1/2009 | Yamane et al. |

FOREIGN PATENT DOCUMENTS

| | | |
|---|---|---|
| JP | 2000-302998 A | 10/2000 |
| JP | 2009-030039 A | 2/2009 |
| JP | 2010-005799 A | 1/2010 |
| JP | 2010-520296 A | 6/2010 |
| WO | WO 2004/044062 A1 | 5/2004 |

* cited by examiner

*Primary Examiner* — Ling Choi
*Assistant Examiner* — Thuy-Ai Nguyen
(74) *Attorney, Agent, or Firm* — Flynn, Thiel, Boutell & Tanis, P.C.

(57) ABSTRACT

A coating composition for preventing frost from enlarging and becoming enormous by making the frost deposited on a surface of an object to be easily peeled and removed from the surface by forming a coating film on the surface of the object, in which 0.2% by mass to 0.5% by mass of antimony-doped tin oxide or indium tin oxide that absorbs an infrared ray so as to hardly influence the hue, with respect to components of a coating material, is added to a water-repellent coating composition such as a fluororesin-based coating material, thereby making the frost adhered on the surface easily peeled from the surface.

1 Claim, No Drawings

ANTI-FROST COATING

TECHNICAL FIELD

The present invention relates to a anti-frost coating that prevents adhesion of frost, snow or the like where water in the air is frozen on a surface of a structure such as a windmill blade or the like, or that makes the adhered frost or the like to be easily removed from the blade or the like.

BACKGROUND ART

A windmill for wind power generation is constructed in an area where humidity is high and temperature change is severe such as in a ridge of a mountain, seashore or the like. Therefore, when the temperature becomes low, moisture in the air becomes frost on a surface of a windmill blade and the adhered frost grows. Snow is easily adheres on the frost of the blade, and the snow near the edge of the blade causes a change of an angle of the blade. It causes a decrease of wind energy conversion efficiency.

In many cases, a blade of a windmill used for wind power generation is made of a fiber-reinforced plastic (FRP) and frost easily adheres on a blade made of FRP with no surface coating. The frost on the blade melts as the temperature goes up and the melt water re-freezes as the temperature goes down, thereby the adhered frost grows large and snow easily adheres thereon. As the windmill blade rotates when the frost adherence on the blade becomes low due to a rise of temperature, a part of the frost may scatter and causes a harm to humans or damages to structures.

There are similar problems to stated above with ice deposition which is a phenomenon that occurs by adhesion of ice as frozen water on a surface of an object and snow deposition which is a phenomenon that occurs by adhesion of snow on an object, and methods capable of suppressing the ice deposition and the snow deposition, and of easily removing the ice deposition have been proposed.

In order to improve the problems such as frost deposition and ice deposition, technology for reducing a contact angle between water and a member by performing a hydrophilization treatment on a surface of the member and for preventing water from staying on a surface of a member has been developed, and PTL 1 (JP-A-55-164264) discloses that synthetic silica and water-based coating material are used in combination.

PTL2 (JP-A-10-168381) discloses a high hydrophilic coating material using alumina sol instead of silica. In addition, PTL 2 also proposes formation of a film on a surface of a member using an organic surface treatment agent.

A coating composition in which a binder resin is mixed with a water-repellent fine particle is proposed as a coating composition used in a coating film. Examples of the binder resin of the coating composition include a solvent-soluble fluororesin, a silicone resin, a polyurethane resin, a polyester resin, and an acrylic silicone resin, and examples of the water-repellent fine particle include fluororesin powder (polytetrafluoroethylene, PTFE), silicone resin-based powder, water-repellent silica powder, graphite fluoride, and fluorinated pitch.

Provision of frost retarding properties or properties of easily removing frost on a surface of a structure in a cold region using a coating composition is realized by inhibiting adhesion of the frost or the like such that surface free energy on a surface of an object is reduced by forming a coating film excellent in water-repellency on the surface of the object, and that the surface of the object is reformed to be water repellent by reducing its affinity with water.

The terms frost, snow, and ice are applied differently depending on the environmental condition when water is transformed from a gas into a solid or from a liquid into a solid, and they are considered as the same as each other from the viewpoint of adhesion of water after being solidified on a surface of an object. Therefore, they are represented by frost hereinafter.

CITATION LIST

Patent Literature

PTL 1: JP-A-55-164264
PTL 2: JP-A-10-168381
PTL 3: JP-A-2011-219653

SUMMARY OF INVENTION

Technical Problem

There has been a proposal for the prevention of frost deposition on a surface of an object by forming a water-repellent coating film on the surface of the object, but only enhancing the water repellency of the coating has attracted attention. The understanding that even if the type of coating which is coated on a surface of an object is changed, adhesion of frost is influenced by the temperature and the change thereof does not affect the adhesion of frost itself, is acknowledged from the result of an experiment in which moisture is spray-supplied to a blade coated with a plurality of coatings while maintaining the temperature of a thermostatic chamber in a range of $-30°$ C. to $-25°$ C. Therefore, an object of the invention is to make the frost adhered on a surface of a member formed with a water-repellent coating film be easily peeled from the surface and not to prevent the adhesion of the frost by enhancing the water repellency.

Solution to Problem

Frost is more easily peeled from a surface of an object by adding an infrared absorbent to a water-repellent coating composition which makes frost adhered on a surface of an object be easily peeled off from the surface.

Any one of antimony-doped tin oxide and indium tin oxide is used as the infrared absorbent and addition of a small amount thereof does not change the hue of the coating film.

The mixing ratio of any one of the antimony-doped tin oxide and indium tin oxide as the infrared absorbent is set to be 0.2% by mass to 0.5% by mass with respect to a water-repellent coating material such as a fluororesin-based coating material to obtain sufficient properties of peeling the frost.

Advantageous Effects of Invention

The temperature of the coating film rises because the infrared absorbent absorbs an infrared ray as a heat ray by adding the infrared absorbent to the water-repellent coating material, thereby easily peeling the frost from the surface of the coating film together with exhibiting the water repellency of the coating film. Thus, it is possible to peel the frost before a significant enlargement of the frost caused by the repetition of melting and refreezing, and therefore, a case where a surface of an object is formed with enlarged frost does not occur.

In a case where the coating composition of the present invention is applied to a surface of a blade of a windmill, it is possible to prevent deterioration of efficiency of the transformation from wind into power caused by the enlarged frost on the surface of the blade and it is possible to inhibit the formation of the enlarged frost being resistant against the rotation of the blade, and therefore, it is possible to prevent the deterioration of power generation efficiency caused by the frost.

DESCRIPTION OF EMBODIMENTS

Antimony-doped tin oxide (ATO) is a tin oxide containing a small amount of antimony oxide and indium tin oxide (ITO) is a complex oxide of indium and tin. Both the infrared absorbents are oxide semiconductors having electrical conductivity, and an ATO film or an ITO film where a film is formed by CVD or sputtering has been used as a transparent conductive film and powder thereof has been used as conductive powder. For example, mixing of powder with a base material such as plastic, rubber, a coating material or the like in order to provide antistatic properties or electrical conductivity, has been implemented. Moreover, the average particle size of the powder being smaller than or equal to 0.2 μm (200 nm) and a small amount of the powder added do not impair the tone of color or transparency of the base material.

In addition, the infrared absorbent can also be used as an infrared ray-screening material because the infrared absorbent absorbs an infrared ray.

Rotating blades made of metal or resin were coated with water-repellent coating materials to which ATO (ITO) powder was added in a ratio of 0% by mass to 0.8% by mass with respect to each white colored coating material such as a fluororesin-based coating material, a polyurethane resin-based coating material, and an acrylic urethane resin-based coating material. Then, moisture was sprayed in air while setting the room temperature of a thermostatic chamber at −25° C. and it was confirmed that frost was adhered on the entire surface of the blades. Thereafter, the surface was irradiated with an infrared ray for two minutes while setting the temperature of the thermostatic chamber to 5° C., and then, the state of the frost on the surface of the blades was observed. The mixing ratio of each coating material is shown in Table 1.

TABLE 1

|  | Fluororesin-based coating material (main agent) | Polyurethane resin-based coating material (main agent) | Acrylic urethane resin-based coating material (main agent) |
|---|---|---|---|
| Fluorine-based resin | 30 | — | — |
| Polyester polyol resin | — | 20 | — |
| Acrylic polyol resin | — | — | 30 |
| Titanium oxide | 25 | 25 | 20 |
| Aromatic solvent | — | — | 35 |
| Ketones solvent | 5 | 15 | — |
| Ester solvent | 20 | 15 | 5 |

|  | Fluororesin-based coating material (hardening agent) | Polyurethane resin-based coating material (hardening agent) | Acrylic urethane resin-based coating material (hardening agent) |
|---|---|---|---|
| Non-yellowing isocyanate | 20 | 25 | 10 |

The result of the experiment is shown in Tables 2 to 7.

The numerical value is a ratio of frost that remains on the surface of the blades after the irradiation with the infrared ray, in which 0 indicates that there is no frost remaining on the surface of the blades and 100 indicates that the frost fully remains on the surface of the blades.

In addition, the level of the hue was visually confirmed to the extent that can be determined as a white color.

TABLE 2

Addition of ATO to fluororesin-based coating material

| | Amount of ATO added (% by mass) | | | | |
|---|---|---|---|---|---|
| | 0 | 0.1 | 0.2 | 0.5 | 0.8 |
| Ratio (%) of frost remained | 40 | 20 | 0 | 0 | 0 |
| Confirmation of hue | ◯ | ◯ | ◯ | ◯ | X |

◯: The color is recognized as white.
X: The color is not recognized as white.

TABLE 3

Addition of ITO to fluororesin-based coating material

| | Amount of ITO added (% by mass) | | | | |
|---|---|---|---|---|---|
| | 0 | 0.1 | 0.2 | 0.5 | 0.8 |
| Ratio (%) of frost remained | 40 | 10 | 0 | 0 | 0 |
| Confirmation of hue | ◯ | ◯ | ◯ | ◯ | X |

◯: The color is recognized as white.
X: The color is not recognized as white.

TABLE 4

Addition of ATO to polyurethane resin-based coating material

| | Amount of ATO added (% by mass) | | | | |
|---|---|---|---|---|---|
| | 0 | 0.1 | 0.2 | 0.5 | 0.8 |
| Ratio (%) of frost remained | 95 | 30 | 0 | 0 | 0 |
| Confirmation of hue | ◯ | ◯ | ◯ | ◯ | X |

◯: The color is recognized as white.
X: The color is not recognized as white.

TABLE 5

Addition of ITO to polyurethane resin-based coating material

| | Amount of ITO added (% by mass) | | | | |
|---|---|---|---|---|---|
| | 0 | 0.1 | 0.2 | 0.5 | 0.8 |
| Ratio (%) of frost remained | 95 | 20 | 0 | 0 | 0 |
| Confirmation of hue | ◯ | ◯ | ◯ | ◯ | X |

◯: The color is recognized as white.
X: The color is not recognized as white.

TABLE 6

Addition of ATO to acrylic urethane resin-based coating material

| | Amount of ATO added (% by mass) | | | | |
|---|---|---|---|---|---|
| | 0 | 0.1 | 0.2 | 0.5 | 0.8 |
| Ratio (%) of frost remained | 100 | 45 | 0 | 0 | 0 |
| Confirmation of hue | ○ | ○ | ○ | ○ | X |

○: The color is recognized as white.
X: The color is not recognized as white.

TABLE 7

Addition of ITO to acrylic urethane resin-based coating material

| | Amount of ITO added (% by mass) | | | | |
|---|---|---|---|---|---|
| | 0 | 0.1 | 0.2 | 0.5 | 0.8 |
| Ratio (%) of frost remained | 100 | 35 | 0 | 0 | 0 |
| Confirmation of hue | ○ | ○ | ○ | ○ | X |

○: The color is recognized as white.
X: The color is not recognized as white.

Result of Experiment

It was identified that the frost could be easily peeled by adding greater than or equal to 0.2% by mass of the infrared absorbent with respect to the coating material, and the adhered frost could be easily peeled by setting 0.2% by mass to 0.5% by mass when considering the hue.

As a fluororesin-based coating material, it is preferable to choose a coating composition configured to have fluorine polyol used for airplanes as a main agent, titanium oxide as a pigment, and non-yellowing isocyanate and a solvent as an additive and a hardening agent.

The average particle size of antimony-doped tin oxide powder that absorbs an infrared ray does not greatly influence the properties of peeling the frost and it is preferable that the average particle size be less than or equal to 0.2 μm so as to hardly influence the hue of the coating material.

As a polyurethane resin-based coating material, it is preferable to choose a coating composition configured to have polyester polyol as a main agent, titanium oxide as a pigment, and non-yellowing isocyanate and a solvent as an additive and a hardening agent.

As an acrylic urethane resin-based coating material, it is preferable to choose a coating composition configured to have acrylic polyol as a main agent, titanium oxide as a pigment, and non-yellowing isocyanate and a solvent as an additive and a hardening agent.

The invention claimed is:

1. An anti-frost coating material for enhancing the removal of frost adhered on a surface of an object, comprising a fluororesin-based coating material and from 0.2% to 0.5% by mass weight of at least one infrared absorbent material selected from the group consisting of an antimony-doped tin oxide and an indium tin oxide with respect to the fluororesin-based coating material, wherein the average particle diameter of the infrared absorbent is smaller than 0.2 μm.

* * * * *